(12) United States Patent
Asano et al.

(10) Patent No.: US 8,513,344 B2
(45) Date of Patent: Aug. 20, 2013

(54) MASTERBATCH FOR COLORING SYNTHETIC RESIN

(75) Inventors: Yuichi Asano, Osaka (JP); Mitsuru Saito, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 120 days.

(21) Appl. No.: 13/130,381

(22) PCT Filed: Oct. 20, 2009

(86) PCT No.: PCT/JP2009/068049
§ 371 (c)(1),
(2), (4) Date: May 20, 2011

(87) PCT Pub. No.: WO2010/058673
PCT Pub. Date: May 27, 2010

(65) Prior Publication Data
US 2011/0230611 A1    Sep. 22, 2011

(30) Foreign Application Priority Data

Nov. 21, 2008   (JP) ................... 2008-298515

(51) Int. Cl.
*C08K 3/22*    (2006.01)
*B82Y 30/00*   (2011.01)
*C08K 9/02*    (2006.01)

(52) U.S. Cl.
USPC ........... 524/431; 524/437; 524/441; 524/487; 524/491; 523/200; 523/202; 523/205

(58) Field of Classification Search
USPC ......... 524/431, 437, 441, 487, 491; 523/200, 523/202, 205
See application file for complete search history.

(56) References Cited

U.S. PATENT DOCUMENTS

| | | | | |
|---|---|---|---|---|
| 6,812,274 B2 * | 11/2004 | Deckers et al. | ............... | 524/487 |
| 7,087,668 B2 * | 8/2006 | Hohner et al. | ............... | 524/487 |
| 2003/0019400 A1 | 1/2003 | Deckers et al. | | |
| 2003/0022978 A1 | 1/2003 | Hohner et al. | | |

FOREIGN PATENT DOCUMENTS

| | | | |
|---|---|---|---|
| JP | 58-167624 | A | 10/1983 |
| JP | 59-501550 | A | 8/1984 |
| JP | 60-96622 | A | 5/1985 |
| JP | 1-306429 | A | 12/1989 |
| JP | 6-212031 | A | 8/1994 |
| JP | 9-241390 | A | 9/1997 |
| JP | 11-106573 | A | 4/1999 |
| JP | 2000-178361 | A | 6/2000 |
| JP | 2001-515939 | A | 9/2001 |
| JP | 2002-3659 | A | 1/2002 |
| JP | 2002-317054 | A | 10/2002 |
| JP | 2003-105096 | A | 4/2003 |
| JP | 2003-517081 | A | 5/2003 |
| JP | 2003-525340 | A | 8/2003 |
| JP | 2003-321552 | A | 11/2003 |
| WO | WO 84/00720 | A1 | 3/1984 |
| WO | WO 99/12997 | A1 | 3/1999 |

\* cited by examiner

*Primary Examiner* — Ling Choi
*Assistant Examiner* — Ronald Grinsted
(74) *Attorney, Agent, or Firm* — Birch, Stewart, Kolasch & Birch, LLP

(57) ABSTRACT

A masterbatch for coloring a synthetic resin of the present invention includes an aluminum pigment, a polyethylene wax, and a linear low-density polyethylene resin, and the masterbatch in a form of cylindrical pellets, each 2.5 mm in diameter and not less than 2 mm and not more than 5 mm in height, has a Rattler value of not more than 2.5%.

2 Claims, No Drawings

MASTERBATCH FOR COLORING SYNTHETIC RESIN

TECHNICAL FIELD

The present invention relates to a masterbatch for coloring a synthetic resin that applies a metallic color to the synthetic resin. In particular, the invention relates to a masterbatch for coloring a synthetic resin that has a feature that the masterbatch mixed and kneaded with any type of noncrystalline and crystalline synthetic resins does not lower the strength of the synthetic resin with which the masterbatch is mixed and kneaded, and to a synthetic resin molded product manufactured using the synthetic-resin-coloring masterbatch.

BACKGROUND ART

When a synthetic resin is to be colored with an MIC (Mold-In-Color) material, a pigment serving as a colorant is directly mixed and kneaded with the synthetic resin for example to thereby color the synthetic resin itself in a desired color. Particularly when a synthetic resin is to be colored in a metallic color, a paste-like aluminum pigment which is generally used for common paints is employed.

A paste-like aluminum pigment, however, contains an organic solvent which is typically mineral spirit or the like, and therefore is usually in a wet state. Due to this, if the paste-like aluminum pigment, as it is, is mixed and kneaded with a synthetic resin to color the synthetic resin, the organic solvent component remains in the synthetic resin and consequently, in some cases, the organic solvent component bleeds from the surface of a synthetic resin molded product into which the synthetic resin is molded. Further, since the aluminum pigment contained in the paste-like aluminum pigment is a metal in itself, the pigment's ability to contact (wettability) with the interface of the synthetic resin is insufficient, resulting in less satisfactory dispersiveness of the aluminum pigment in the synthetic resin. For these reasons, it has been difficult in some cases to sufficiently color a synthetic resin molded product in a metallic color.

In order to solve these problems, it has been proposed that particles of a metal such as aluminum are covered with a coating containing for example a terpene phenol resin and a low-density polyethylene resin to produce a free flowing granular material, the granular material is formed into pellets (so-called masterbatch), and the pellets are mixed and kneaded with a synthetic resin to color the resin in a metallic color (Japanese National Patent Publication No. 59-501550 (Patent Document 1)).

The proposed masterbatch is easy to handle, contains almost no organic solvent component like the one contained in the paste-like aluminum pigment, has adequate dispersiveness in the synthetic resin, and is therefore used for coloring a polyethylene film or the like in a metallic color.

PRIOR ART DOCUMENTS

Patent Documents

Patent Document 1: Japanese National Patent Publication No. 59-501550

SUMMARY OF THE INVENTION

Problems to be Solved by the Invention

In the case where a masterbatch like the above-described one for which a terpene phenol resin and a low-density polyethylene resin are used is mixed and kneaded with a noncrystalline resin (such as ABS resin for example), the terpene phenol resin and the low-density polyethylene resin included in this masterbatch may cause the strength of the synthetic resin molded product to decrease.

The present invention has been made in view of the circumstances above, and an object of the invention is to provide a masterbatch for coloring a synthetic resin that is not accompanied by a decrease in strength of a synthetic resin molded product due to a resin component or the like included in the masterbatch, even when the masterbatch is mixed and kneaded with a noncrystalline synthetic resin for coloring the resin in a metallic color.

Means for Solving the Problems

The inventor of the present invention has conducted thorough studies in order to solve the above-described problems, found that this object can be achieved by using a specific polyethylene resin as a resin component included in a masterbatch for coloring a synthetic resin, and setting a Rattler value to a specific value or less, and conducted further studies based on this finding to finally complete the present invention.

Specifically, a masterbatch for coloring a synthetic resin of the present invention includes an aluminum pigment, a polyethylene wax, and a linear low-density polyethylene resin, and a Rattler value of the masterbatch in a form of cylindrical pellets of 2.5 mm in diameter and not less than 2 mm and not more than 5 mm in height is not more than 2.5%.

Here, in the masterbatch for coloring a synthetic resin of the present invention, preferably the polyethylene wax and the linear low-density polyethylene resin are contained at a ratio by mass of 9:1 to 7:3, and preferably the aluminum pigment is contained in a range of not less than 60% by mass and not more than 80% by mass.

Further, the present invention also relates to a synthetic resin molded product manufactured using such a masterbatch for coloring a synthetic resin.

Effects of the Invention

The masterbatch for coloring a synthetic resin of the present invention has the features as described above and therefore has an excellent effect that, even if the masterbatch is mixed and kneaded with a noncrystalline synthetic resin, it does not deteriorate the strength of a synthetic resin molded product.

MODES FOR CARRYING OUT THE INVENTION

A masterbatch for coloring a synthetic resin of the present invention includes an aluminum pigment, a polyethylene wax, and a linear low-density polyethylene resin, characterized in that the masterbatch in a form of cylindrical pellets, each 2.5 mm in diameter and not less than 2 mm and not more than 5 mm in height, has a Rattler value of not more than 2.5%. As long as the synthetic-resin-coloring masterbatch of the present invention includes such components each and such a Rattler value as described above, the masterbatch may include any conventionally known additives contained in a masterbatch of this type. A more detailed description will be given below of each component and the like of the synthetic-resin-coloring masterbatch of the present invention.

<Aluminum Pigment>

The aluminum pigment used for the present invention is not particularly limited. For example, a flake-like aluminum pigment having an average particle size of approximately 5 to 250 µm may be used. Preferably, an aluminum pigment having an average particle size of approximately 5 to 30 µm or approximately 60 to 150 µm is suitable, and any aluminum pigment may be selected depending on the purpose of coloring and the use. As long as the average particle size of the aluminum pigment falls in the above-defined ranges, a fine metallic taste may be added to the resin, or a design such as a granular and brilliant sparkling taste may be added to the resin.

Note that the average particle size of the present invention refers to an average particle size determined by calculating the volume average based on a particle size distribution measured by a known particle size distribution measurement method such as laser diffractometry method, micromesh sieve method, Coulter counter method, or the like.

Further, the aluminum pigment may be obtained through any process of manufacture. For example, aluminum powder which is a raw material for the pigment may be set into a wet state by an organic solvent such as mineral spirit in a ball mill, and steel balls may be used to wet-grind this aluminum powder to produce an aluminum pigment or the like to be used.

Further, to the surface of the aluminum pigment of the present invention, stearic acid, oleic acid or the like which is added in the above-described wet grinding as a grinding aid may stick. Furthermore, the aluminum pigment having its surface subjected to surface treatment as appropriate may be used.

<Polyethylene Wax>

The polyethylene wax used for the present invention preferably has the features of low crystallinity, low density, and good dispersiveness (miscibility) in another resin. Specifically, such a polyethylene wax may be the one having a melt viscosity at 140° C. in a range of 150 to 6000 mPa·s, and particularly, it may preferably be in a range of 3000 to 5000 mPa·s.

The polyethylene wax having such a melt viscosity exhibits an excellent function as follows. When a masterbatch for coloring a synthetic resin of the present invention is manufactured, the linear low-density polyethylene resin described later herein is kneaded with the aluminum pigment while being heated. At this time, the polyethylene wax uniformly disperses the aluminum pigment in the masterbatch.

Note that the above-described melt viscosity is a viscosity determined as an absolute viscosity (mPa·s) in a melt state, in accordance with the following conversion formula (expression 1) using a kinematic viscosity (mm²/s) which can be measured following the Ubbelohde method of JIS K 2283: 2000.

Specifically, the polyethylene wax is added to tetralin (tetrahydronaphthalene) of the same mass, and heated to be melt at 120° C. or less to obtain a dilute solution of 50% in concentration. This solution is used to measure the kinematic viscosity in accordance with the Ubbelohde method at a measurement temperature of 100° C. Then, this kinematic viscosity is converted by the following (expression 1) to determine a value (namely the absolute viscosity) which is the melt viscosity.

$$\text{Melt viscosity}(mPa\cdot s/140°\ C.) = (\text{kinematic viscosity}\ (mm^2/s)) \times 11.68 - 190 \quad \text{(expression 1)}$$

Further, the polyethylene wax of the present invention preferably has, in addition to the above-described melt viscosity, a density of 900 to 930 kg/m³. This density is more preferably 910 to 920 kg/m³. Thus, as long as the density falls in the range of 900 to 930 kg/m³, the polyethylene wax has the functions that the polyethylene wax has low crystallinity and can be easily kneaded with a noncrystalline resin. This density can be measured for example in accordance with JIS K 6760:1990.

As a polyethylene wax having the features as described above, a generally commercially available one may be used. Examples of the polyethylene wax may be SANWAX products manufactured by Sanyo Chemical Industries, Ltd., HIGHWAX products manufactured by Mitsui Chemicals, Inc, and the like.

As clearly seen from the description above, this polyethylene wax of the present invention has a function of enabling a masterbatch of a uniform composition to be manufactured, and also has a function of allowing easy dispersion in a noncrystalline resin to provide one of the characteristics of the present invention.

<Linear Low-Density Polyethylene Resin>

The linear low-density polyethylene resin used for the present invention preferably has the functions of low crystallinity, low density, excellent strength and ductility, and good compatibility with another resin. Such a linear low-density polyethylene resin specifically refers to a polyethylene resin obtained by polymerization using a metallocene catalyst and having a narrow molecular weight distribution (Mw/Mn). Here, "linear" conceptually means a polyethylene molecule with relatively few branched chains and side chains, and it does not only refer to a straight chain molecule in terms of the chemical structure.

More specifically, this linear low-density polyethylene resin of the present invention preferably has a melt flow rate in a range of 1.0 to 6.0 g/10 min, and more preferably in a range of 3.0 to 5.0 g/10 min. A linear low-density polyethylene resin having such a melt flow rate has a similar mechanical strength to a resin (matrix resin) to be colored by the masterbatch and has a high impact strength, and therefore, has an excellent function that it doe not deteriorate the mechanical strength of the matrix resin. Moreover, such a linear low-density polyethylene resin has excellent ductility and toughness and therefore also has a function of improving the strength of the masterbatch itself. Note that the melt flow rate can be measured in accordance with JIS K 7210:1999.

Further, the linear low-density polyethylene resin of the present invention preferably has the following density and melting point in addition to the above-described melt flow rate. Specifically, the density is preferably in a range of 900 to 940 kg/m³, and more preferably in a range of 920 to 930 kg/m³. The density in such a range provides the functions that the crystallinity is low and that it can easily be kneaded with a noncrystalline resin, like the above-described polyethylene wax. Note that this density can be measured in a similar manner to that for the above-described polyethylene wax.

The melting point of the linear low-density polyethylene resin is preferably 95 to 130° C., and more preferably 110 to 125° C. The linear low-density polyethylene resin having such a melting point can be easily melt in a heating and kneading process for manufacturing a masterbatch or a synthetic resin molded product, and is excellent in workability. Note that such a melting point can be measured for example in accordance with JIS K 7121.

As such a linear low-density polyethylene resin, a generally commercially available one may be used that may for example be Evolue (trade name) or the like manufactured by Prime Polymer Co., Ltd.

As clearly seen from the foregoing description, such a linear low-density polyethylene resin of the present invention has a function of capable of keeping the original strength of a synthetic resin molded product colored with the masterbatch without deteriorating the mechanical strength thereof, and is used together with the above-described polyethylene wax to provide one of the characteristics of the present invention.

<Rattler Value>

The masterbatch for coloring a synthetic resin of the present invention requires a Rattler value of 2.5% or less when the masterbatch is in the shape of cylindrical pellets each having a diameter of 2.5 mm and a height of not less than 2 mm and not more than 5 mm.

Here, the Rattler value refers to a value measured in accordance with "JPMA P11-1922" defined by the Japan Powder Metallurgy Association's standard. Specifically, a synthetic-resin-coloring masterbatch in the shape of cylindrical pellets each having a diameter of 2.5 mm and a height of not less than 2 mm and not more than 5 mm is manufactured first. This can be manufactured in the following manner. For example, predetermined amounts of an aluminum pigment (the aluminum pigment may be in the form of paste), a polyethylene wax, and a linear low-density polyethylene resin are heated and kneaded by means of a universal agitator or the like, the resultant kneaded matter is ground by a grinding method such as crusher, and the ground matter is formed into cylindrical pellets by a disk pelletizer. Then, 15.00 g ("enclosed mass") of the synthetic-resin-coloring masterbatch having such a shape (the height may include different heights as long as they are 2 mm or more and 5 mm or less) is measured, enclosed in a stainless mesh basket having one block plate on the inner surface and a sieve opening size of 1180 μm, rotated to make 1000 rotations at a speed of 87±10 rpm. After this, the synthetic-resin-coloring masterbatch remaining in the sieve (namely the stainless mesh basket) is measured ("remaining mass"). Subsequently, based on respective masses having been measured, the mass decrease rate is determined from a calculation formula (enclosed mass−remaining mass)/(enclosed mass)×100, and the determined value is used as the Rattler value of the present invention.

Namely, this Rattler value represents to what degree the shape is kept when an impact is applied, and serves as a measure of the strength of the synthetic-resin-coloring masterbatch. The synthetic-resin-coloring masterbatch of the present invention requires that the Rattler value be 2.5% or less, and preferably 1.5% or less. Such a Rattler value of the synthetic-resin-coloring masterbatch of the present invention when mixed and kneaded with a synthetic resin exhibits an excellent effect that the strength of the synthetic resin molded product does not decrease.

<Masterbatch for Coloring Synthetic Resin>

The masterbatch for coloring a synthetic resin of the present invention is used for applying a metallic color to the synthetic resin, and requires that the masterbatch in the form of cylindrical pellets each 2.5 mm in diameter and not less than 2 mm and not more than 5 mm in height should have a Rattler value of 2.5% or less. The shape of the masterbatch is not limited to the cylindrical pellets, and may be any shape. Preferably, however, the shape of cylindrical pellets as described above is suitable.

Such a synthetic-resin-coloring masterbatch of the present invention preferably contains the above-described polyethylene wax and the above-described linear low-density polyethylene resin at a ratio by mass of 9:1 to 7:3, and more preferably at a ratio by mass of 8.5:1.5 to 7.5:2.5.

The ratio by mass falling in the above-described ranges provides a high productivity when the synthetic-resin-coloring masterbatches are manufactured. For example, if the above-described ratio by mass of the linear low-density polyethylene resin exceeds 3 (namely the content of the linear low-density polyethylene resin exceeds 30% of the sum of the linear low-density polyethylene resin and the polyethylene wax), the strength of the resin component of the masterbatch (also referred to as carrier resin which includes both the polyethylene wax and the linear low-density polyethylene resin) is too high. There is accordingly a tendency that the process efficiency when the masterbatch is removed from the kneader and the productivity in pelletization deteriorate. If the above-described ratio by mass of the polyethylene wax exceeds 9 (namely the content of the polyethylene wax exceeds 90% of the sum of the linear low-density polyethylene resin and the polyethylene wax), the strength of the resin component of the masterbatch is lower, resulting in the possibility that the masterbatch being transported for example loses its shape.

Further, the synthetic-resin-coloring masterbatch of the present invention preferably contains the above-described aluminum pigment in a range of not less than 60% by mass and not more than 80% by mass, and more preferably in a range of not less than 65% by mass and not more than 75% by mass.

Where the content of the aluminum pigment falls in a range of not less than 60% by mass and not more than 80% by mass, the content of the resin component in the masterbatch is relatively lower, which provides the effect that the ratio of a resin component (called "contamination") other than the matrix resin when the masterbatch is added to the matrix resin for the purpose of coloring the resin can be reduced. Such "contamination" is a factor of reduction in strength of the matrix resin. Accordingly, the lower ratio of the contamination contributes to prevention of reduction in strength of the matrix resin.

If the content of the aluminum pigment exceeds the above-described limit, the strength of the masterbatch decreases, and the masterbatch will lose its shape even under a light impact. If the shape is thus lost, powder is generated while the masterbatch packaged in a container or casing is transported for example, resulting in inconvenience in handling of the masterbatch when blended in a matrix resin for the purpose of coloring the resin. This is also unfavorable because the facility or the like could be contaminated due to scattering of the powder.

Further, the masterbatch and the matrix resin are fed by a screw feeder or the like, melt and kneaded to form a synthetic resin molded product. At this time, if the powder is included in the masterbatch, the powder is fed together with the masterbatch to be mixed and kneaded with the matrix resin, resulting in a difference in concentration of the aluminum pigment in a synthetic resin molded product produced initially in a series of molding processes and a synthetic resin molded product produced later (the synthetic resin molded product produced initially has a higher concentration of the aluminum pigment). In view of the conditions above, it is preferable that the content of the aluminum pigment is in a range of not less than 60% by mass and not more than 80% by mass to prevent the powder from being generated.

The synthetic-resin-coloring masterbatch of the present invention may contain any conventionally known additives as long as they do not hinder the present invention from exhibiting its effects. Such additives include for example extender pigments such as talc and silica, organic pigments such as azo-based pigment, anthraquinone-based pigment, quinacridon-based pigment, phthalocyanine-based pigment, perylene-based pigment, perinone-based pigment, dioxazine-based pigment, and quinophthalone-based pigment, inorganic pigments such as titanium oxide, bengala, ultramarine, iron blue, yellow ferric oxide, chrome yellow, chrome vermillion, and composite oxide-based pigment, pigments such as carbon black, dispersant, and the like.

The dispersant in the foregoing may include metallic soaps such as aluminum stearate, magnesium stearate, calcium stearate, strontium stearate, lithium stearate, zinc stearate, and calcium stearate, silane coupling agents such as vinyltrimethoxysilane, vinyltriethoxysilane, vinyltris(2-methoxyethoxy)silane, N-(2-aminoethyl) 3-aminopropyltrimethoxysilane, N-(2-aminoethyl) 3-aminopropylmethyldimethoxysilane, 3-aminopropyltrimethoxysilane, 3-aminopropyltriethoxysilane, 3-glycidoxypropyltrimethoxysilane, 3-glycidoxypropylmethyldimethoxysilane, 3-chloropropylmethyldimethoxysilane, 2-(3,4-epoxycyclohexyl)ethyltrimethoxysilane, 3-chloropropyltrimethoxysilane, 3-methacryloxypropyltrimethoxysilane, and 3-mercaptotripropyltrimethoxysilane, maleic anhydride, and the like.

<Method of Manufacturing Synthetic-Resin-Coloring Masterbatch>

The masterbatch for coloring a synthetic resin of the present invention may be manufactured by any known manufacturing method. For example, the above-described aluminum pigment (an aluminum pigment in the form of paste may also be used), polyethylene wax, and linear low-density polyethylene resin are kneaded while being heated by a universal agitator or the like (kneading process). The heating temperature in the kneading process varies depending on the blended resin components (namely polyethylene wax and linear low-density polyethylene resin). Usually the temperature in a range of 140 to 180° C. is preferred. Further, the kneading time of the kneading process is not particularly limited as long as the blended resin components are uniformly dispersed with the aluminum pigment. Usually the time of 0.5 to 2 hours is preferred.

Such heating temperature and kneading time as described above are preferred since the solvent component contained in the aluminum pigment paste is removed even if a paste-like aluminum pigment (so-called aluminum pigment paste) is used.

Subsequently, after the resultant product is uniformly kneaded in such a kneading process, the kneaded matter is ground by a grinding method such as crusher (grinding process), and a substantially 100% solid pellet-like masterbatch for coloring a synthetic resin of the present invention can be manufactured by a disk pelletizer.

<Synthetic Resin Molded Product>

The synthetic-resin-coloring masterbatch of the present invention obtained in the above-described manner can be mixed and kneaded with a synthetic resin (namely a matrix resin to be colored) as appropriate to suitably manufacture a synthetic resin molded product. In other words, the synthetic resin molded product of the present invention is manufactured using the synthetic-resin-coloring masterbatch of the present invention.

Here, the content of the masterbatch in the matrix resin is preferably 0.1 to 7.0% by mass, and more preferably 0.7 to 5.0% by mass. It is preferable that the content of the masterbatch falls in a range of 0.1 to 7.0% by mass, because the ratio of so-called "contamination" decreases, and the strength of the matrix resin can be prevented from being decreased.

The type of the synthetic resin (matrix resin) which can be colored by the synthetic-resin-coloring masterbatch of the present invention (namely with which the masterbatch can be mixed and kneaded) is not particularly limited, and may include various conventionally known synthetic resins. In particular, it may be a noncrystalline synthetic resin such as ABS resin. A significant feature of the present invention is that the masterbatch can color such a noncrystalline synthetic resin without causing the strength to decrease. Conventional synthetic-resin-coloring masterbatches could not color a noncrystalline synthetic resin without decreasing the strength.

As seen from the above, the synthetic-resin-coloring masterbatch of the present invention exhibits excellent effects that the masterbatch can be mixed and kneaded with any of noncrystalline and crystalline synthetic resins without decreasing the strength, and can suitably color the synthetic resin.

A synthetic resin molded product of the present invention as described above is a molded product molded by any of conventionally known various molding methods such as injection molding, extrusion, blow molding and the like, and the shape or the like of the product is not particularly limited. Not only such a final molded product but also an intermediate workpiece before processed into a final shape (such as colored pellets produced by kneading the synthetic-resin-coloring masterbatch of the present invention and a matrix resin to be colored, into pellets) are included in the synthetic resin molded product of the present invention.

EXAMPLES

In the following, the present invention will be described in more detail with reference to Examples. The present invention, however, is not limited to them.

As aluminum pigments of Examples and Comparative Examples, a paste containing an aluminum pigment with an average particle size of 20 μm (trade name "ALPASTE TCR 2020" manufactured by Toyo Aluminium K.K.) was used, and blended so that the content of the (solid) aluminum pigment contained in the masterbatch was 70% by mass. In the present Examples, the average particle size of the aluminum pigment is a particle size at 50% of the cumulative distribution measured by the laser diffractometry by means of a laser diffractometry particle size distribution meter (trade name "Microtrac HRA9320-X100" manufactured by Nikkiso Co., Ltd.).

First, a universal agitator was used to uniformly knead the materials at the blending ratio shown in Table 1 below at a heating temperature in kneading of 160° C., and remove the gas to produce a mixture. Subsequently, the obtained mixture was ground in advance by means of a crusher or the like, and a disk pelletizer was used to produce a synthetic-resin-coloring masterbatch in the shape of cylindrical pellets each having a diameter φ of 2.5 mm and a height of not less than 2 mm and not more than 5 mm.

In Table 1 below, as the polyethylene wax, trade name "SANWAX 161-P" (melt viscosity: 4300 mPa·s/140° C., density: 920 kg/m$^3$) manufactured by Sanyo Chemical Industries, Ltd. was used. As the linear low-density polyethylene resin, trade name "Evolue SP2510" (melt flow rate: 1.5 g/10 min, density: 923 kg/m$^3$, melting point: 121° C.) manufactured by Prime Polymer Co., Ltd. was used. The Rattler value was measured in the manner as described above.

Next, each synthetic-resin-coloring masterbatch thus produced was used to color an ABS resin, and a synthetic resin molded product made of the ABS resin was manufactured. Specifically, each masterbatch and the ABS resin were blended at a ratio described below, kneaded and extruded into colored pellets, and the colored pellets were injection-molded into a synthetic resin molded product (test piece).

Here, as a synthetic resin to be colored, an ABS resin ("heat resistant ABS resin MTH-2" manufactured by Nippon A & L Inc., melt flow rate: 11.4, density: 1040 kg/m$^3$) was used. For manufacturing the above-described colored pellets, the synthetic-resin-coloring masterbatch was blended so that its content was 2.86% by mass (aluminum pigment 2.00%). A same-direction twin-screw extruder BT-30-X-30L (screw diameter:

30 mm, L/D ratio: 30, die diameter φ: 3 mm×two) manufactured by Research Laboratory of Plastics Technology Co., Ltd. was used to perform kneading and extrusion at an extrusion temperature of 220° C., the strand was water-cooled and palletized with a cutter. After this, the colored pellets thus manufactured were injection molded at a molding temperature of 250° C. to produce a test piece.

Then, this test piece was used to perform a tensile test and an Izod impact test. The tensile test was conducted in accordance with JIS K 7113, the shape of the test piece was model No. 1, and the tensile yield stress (MPa) was measured at a tensile speed of 50 mm/min. The Izod impact test was conducted in accordance with JIS K 7110 with a test piece in the shape of model No. 2 under 4 J to measure the Izod impact strength ($kJ/m^2$).

TABLE 1

| | Blending Ratio | | | |
| --- | --- | --- | --- | --- |
| | aluminum pigment (% by mass) | polyethylene wax (% by mass) | linear low-density polyethylene resin (% by mass) | Rattler value (%) |
| Example 1 | 70 | 27 | 3 | 2.27 |
| Example 2 | 70 | 24 | 6 | 1.43 |
| Comparative Example 1 | 70 | 30 | 0 | 3.44 |

From a comparison between the synthetic-resin-coloring masterbatch of Example 1 and the synthetic-resin-coloring masterbatch of Example 2, it can be confirmed that the Rattler value of Example 2 is lower than the Rattler value of Example 1, and the strength of the synthetic-resin-coloring masterbatch increases with an increase in an amount of the added linear low-density polyethylene resin. In contrast, it is apparent that the synthetic-resin-coloring masterbatch of Comparative Example 1 without containing the linear low-density polyethylene resin has a higher Rattler value and the strength of the synthetic-resin-coloring masterbatch is insufficient.

The test piece manufactured using the synthetic-resin-coloring masterbatch of Example 2 had a tensile yield stress of 45.6 MPa, and no reduction in strength was identified relative to the tensile yield stress (45.6 MPa) of the ABS resin before being colored. Further, it was visually confirmed that a fracture surface of the test piece of Example 2 did not have phase separation, ant it was confirmed that the synthetic-resin-coloring masterbatch was uniformly dispersed. Further, the test piece of Example 2 had an Izod impact strength of 17.5 $kJ/m^2$, and no strength reduction relative to the Izod impact strength (17.3 $kJ/m^2$) of the ABS resin was confirmed.

In contrast, the test piece manufactured using the synthetic-resin-coloring masterbatch of Comparative Example 1 had an Izod impact strength of 17.6 $kJ/m^2$ which is almost the same as the Izod impact strength of the ABS resin, while the tensile yield stress of the test piece was 45.4 MPa which is considerably lower than the tensile yield stress (45.6 MPa) of the ABS resin before being colored. Such a reduction in strength of the test piece of Comparative Example 1 had a high relevance with the above-described result of the Rattler value (the result that the Rattler value of Comparative Example 1 is higher than those of Example 1 and Example 2).

It is clear from the above results of the tests that a synthetic resin molded product manufactured using a synthetic-resin-coloring masterbatch of the present invention is colored without reduction of its strength. It has been confirmed that the masterbatch of the present invention is particularly effective when used for a noncrystalline resin such as ABS resin.

While the embodiments and examples of the present invention have been described, it is originally intended that the above-described features of the embodiments and examples may be combined as appropriate.

It should be construed that the embodiments and examples disclosed herein are by way of illustration in all respects, not by way of limitation. It is intended that the scope of the present invention is defined by claims, not by the description above, and encompasses all modifications and variations equivalent in meaning and scope to the claims.

The invention claimed is:
1. A masterbatch for coloring a synthetic resin,
said masterbatch comprising an aluminum pigment, a polyethylene wax, and a linear low-density polyethylene resin,
said polyethylene wax having a melt viscosity at 140° C. of 150 to 6000 mPa·s and a density of 900 to 930 $kg/m^3$,
said linear low-density polyethylene resin being obtained by polymerization using a metallocene catalyst, having a melt flow rate of 1.0 to 6.0 g/10 min, measured in accordance with JIS K 7210:1999, a density of 900 to 940 $kg/m^3$, and a melting point of 95 to 130° C.,
said polyethylene wax and said linear low-density polyethylene resin being contained at a ratio by mass of 9:1 to 7:3,
said aluminum pigment being contained in a range of not less than 60% by mass and not more than 80% by mass compared to the total mass of said masterbatch, and
a Rattler value of said masterbatch in a form of cylindrical pellets of 2.5 mm in diameter and not less than 2 mm and not more than 5 mm in height being not more than 2.5%.
2. A synthetic resin molded product manufactured using a masterbatch for coloring a synthetic resin as recited in claim 1.

* * * * *